United States Patent
Shiloff

[15] 3,650,690
[45] Mar. 21, 1972

[54] BORIC ACID PRODUCTION
[72] Inventor: Jerome C. Shiloff, Pleasantville, N.Y.
[73] Assignee: Stauffer Chemical Company, New York, N.Y.
[22] Filed: Oct. 18, 1968
[21] Appl. No.: 768,887

[52] U.S. Cl. .................................................23/149, 23/121
[51] Int. Cl. ....................................C01b 35/00, C01d 5/02
[58] Field of Search ............................................23/149, 121

[56] References Cited

UNITED STATES PATENTS

| 137,072 | 3/1873 | Gutzkow | 23/149 |
| 3,454,359 | 7/1969 | Morley et al. | 23/149 |
| 3,468,626 | 9/1969 | Sawyer | 23/149 |

Primary Examiner—Earl C. Thomas
Assistant Examiner—G. Alvaro
Attorney—Paul J. Juettner, Wayne C. Jaeschke and Martin Goldwasser

[57] ABSTRACT

Boric acid is produced by treating an alkali metal borate ore with concentrated sulfuric acid in an amount sufficient to provide an alkali metal to sulfur mole ratio of 1.5 to 2.5, contacting the so treated ore with superheated steam at temperatures of 100° to 500° C. to produce a gaseous boric acid-containing effluent, removing the effluent and recovering the boric acid therefrom.

10 Claims, No Drawings

BORIC ACID PRODUCTION

The present invention relates to an improved method for the production of boric acid and its dehydration product, boric oxide, and more particularly, it relates to the production of boric acid from alkali metal borates such as the naturally occurring mineral ore, kernite.

Boric acid and derivatives there are consumed chiefly in the glass and ceramic industries and, to a lesser although important extent, in formulating a wide variety of products including herbicides, fertilizers, antifreezes, weed control chemicals, soaps and cleaners, drugs, cosmetics, and fire retarding agents. Additionally, boron-containing fibers show high application potential for aeronautical, industrial, and civilian construction materials. The preferred commercial method of preparing boric acid, at present, is by way of digestion of the ore with a mineral acid followed by crystallization of boric acid. Boric oxide and boric acid can also be recovered by pyrolysis of metal borates including colemanite and ulexite. In accordance with one pyrolysis method which is described in U.S. Pat. No. 2,898,192, colemanite ($2CaO \cdot 3B_2O_3 \cdot 5H_2O$) is moistened with water and charged into a reaction furnace heated to an elevated temperature. Heat transferred into the moistened solid reaction mass generates saturated steam which carries boric oxide out of the furnace for condensation in a suitably cooled recovery zone. It is further disclosed that an acidic oxide, e.g., silica, enhances boric oxide removal. While it is disclosed that some boron-containing material is removed at temperatures as low as 300° F., the rate of recovery is slow even at about 1,000° F., and furnace temperatures as high as 1,900° F. are exemplified in the patent. In accordance with another high temperature method of recovering boric acid which is described in U.S. Pat. No. 3,026,178, metal borates are contacted with substantially anhydrous HCl either in pure form or admixed with an inert carrier gas such as, e.g., nitrogen, in a heated reaction furnace. Boron-containing material is removed in the gaseous effluent and condensed to produce boric acid. The lowest reaction temperature which is disclosed for operability is about 500° C., and the upper limit is about 1,400° C. Another method for the manufacture of boric acid is described in Gutzkow Patent No. 137,072, which teaches contacting an admixture of coke and borate ore, which mixture has been treated with lime and dilute sulfuric acid, with superheated steam in an apparatus wherein the steam enters the bottom and flows upward through the reaction mass toward the upper portion of the apparatus where there is an exit port which leads into a condensation tower for condensing any boron-containing material which has been removed by the gaseous effluent. While these and other pyrolysis methods for recovering boric acid are disclosed in the art, pyrolysis of metal borates has not been successfully employed in commercial practice for reasons which include the relatively high temperature and protracted reaction times necessary to effect economical yields, and problems arising from the necessity of transferring large quantities of heat into and through solid reactant materials of poor heat conductivity. The use of upright reactors and super-heated steam present further difficulties inasmuch as the steam tends to form pathways from the bottom to the top, e.g., follows the path of least resistance, so that areas of the charge are not effectively contacted with the steam.

It has now been discovered that boric acid can be recovered from hydrated borate ores by pretreating the same so as to provide a dry and free flowing material which can be easily and effectively pyrolysed to obtain high yields of boron values.

In accordance with the present invention, boric acid can be produced from alkali metal borate ore by pre-treating the ore with concentrated sulfuric acid in an amount to provide an alkali metal to sulfur mole ratio of from approximately 1.5 to approximately 2.5 and preferably from approximately 1.9 to approximately 2.1, followed by contacting the pre-treated ore in a suitable reaction zone with superheated steam preferably at temperatures ranging from 100° to 600° C., stripping the gaseous boron-containing material from the reaction zone in the gaseous effluent containing superheated steam and recovering boric acid from the gaseous material.

The pretreated ore is a dry, free-flowing material from which high yields of boric acid can be easily extracted by the use of superheated steam.

The ore which can be processed by the method of the present invention can be any alkali metal borate ore and is particularly applicable to the alkali metal tetraborate class of ores. The method is especially applicable to the recovery of boron values from the naturally occurring and abundant mineral, kernite or rasorite ($Na_2B_4O_7 \cdot 4H_2O$). Other alkali metal borate ores which can be processed by the method of the invention are illustrated by borax ($Na_2B_4O_7 \cdot 10H_2O$), tincalconite ($Na_2B_4O_7 \cdot 5H_2O$), ezcurrite ($2NaO \cdot 5B_2O_3 \cdot 7H_2O$), Suhr'o borate ($2Na_2O \cdot 5 \cdot 1B_2O_3 \cdot 7H_2O$), nasinite or Auger's sodium borate ($2Na_2O \cdot 5B_2O_3 \cdot 5H_2O$), sodium tetraborate ($Na_2B_2O$), sodium metaborate tetrahydrate ($Na_2O \cdot B_2O_3 \cdot 8H_2O$), sodium metaborate dihydrate ($Na_2N_2O_4 \cdot 4H_2O$), sodium pentaborate ($Na_2O \cdot 5B_2O_3 \cdot 10 H_2O$), or the compound $2Na_2O \cdot 9B_2O_a \cdot 11H_2O$. These are given as illustrative and the invention is no way intended to be limited thereto.

Prior to processing, the ore is crushed and screened to remove large ore particles and, desirably, provide a processed ore of substantially uniform particle size. It is preferred that the majority of the ore particles have a mesh screen size of between about 100 and about 400 mesh screen size. More preferably, at least 80 percent of the ore particles desirably have a particle size within the range of from about 100 to about 150 mesh screen size. The preferred mineral kernite is particularly adapted for use in the process of the present invention as it is obtained from the mine as spherical particles with a size range from about 4 to about 150 mesh screen size, about 85 percent being between about 100 and about 120 mesh screen size.

The ore particles are pretreated with concentrated sulfuric acid. By concentrated is meant that the acid has an $H_2SO_4$ content of at least 90 percent and usually from about 93 to 96 percent $H_2SO_4$. The acid is added in a stoichiometric amount sufficient to provide about one sulfur atom for every two alkali metal atoms in the ore. A slight molar excess of up to 10 percent by weight can be used if desired. Any known mixing means can be used to effect the treatment of the ore with the concentrated sulfuric acid though it is preferred to effect the admixture in a pulverizing apparatus such as a ball mill. Preferably, the temperature of the admixture is maintained below 120° C., if necessary, with suitable cooling means.

The acid treated ore admixture is then placed in an apparatus wherein the ore can be subjected to the action of steam to extract the boron values from the ore. Preferably, any reactor which can continually agitate the ore during the steam treatment can be used, such as a rotary kiln. More preferably, the reactor is adapted to a continuous reaction process wherein fresh ore is continually fed to the reactor and, boron values and gangue are continually removed.

The steam for use in stripping the boron values from the ore is preferably superheated steam having a temperature of at least above the volatilization temperature of boric acid (in combination with the system conditions). The steam temperature can range as high as about 600° C. though preferably as high as 400° C. and more preferably the temperature ranges from about 150° C. to about 250° C. The steam can be used to maintain this temperature or the reactor can be provided with external heating means to assist in the temperature maintenance. The superheated steam can be prepared by any known method of preparing the same, such as by the complete combustion of normally gaseous hydrocarbons, e.g., $C_1$-$D_3$ hydrocarbons such as is contained in natural gas, to obtain a mixture containing essentially carbon dioxide, nitrogen and superheated steam.

The contact of the ore with the steam effects a liberation of the boron values from the ore which are then removed from the reactor as a gaseous effluent. The boron values in the form of boric acid can be recovered by condensation of the gaseous effluent to form a liquor comprising essentially 100 percent orthoboric acid in water, and crystallization of the acid from the solution. Any other means of separating the gaseous effluent and effecting recovery of the boron values can also be used.

The present invention is further illustrated in the examples which follow:

EXAMPLE 1

100 grams of razorite ore is mixed with 35.5 grams of concentrated (95 percent) sulfuric acid with a pulverizing action. The resulting mixture is a dry, free-flowing powder having the following analysis:

|      | Found  | Theoretical |
|------|--------|-------------|
| Na   | 11.6%  | 11.8%       |
| B    | 10.8%  | 11.1%       |
| S    | 7.85%  | 8.2%        |
| Na/S | 2.06   | 2.00        |
| B/Na | 1.95   | 2.00        |

Two grams of the aforeprepared mixture is placed in a reactor tube set slightly diagonally from horizontal. The reactor is heated to 150° C. and steam is passed through. The passage of the steam is continued for 3-½ hours during which time the temperature is increased to 400° C. At the end of the 3-½ hour reaction period, the original 2.0 gram sample had decreased to 0.53 grams with a total boron content of 0.014 grams. The original sample contained 0.216 grams of boron, indicating that 93.7 percent of the boron values had been vaporized.

EXAMPLE 2

15 grams of $H_2SO_4$ treated kernite prepared as in Example 1 in a 1.1 molar ratio are placed in a glass tube having a spirally wound wire agitator and saddle beads therein and plugged with glass wool. The tube is placed in a tubular furnace in a horizontal position and rotated. The furnace is heated to 200° C. and steam is passed into one end of the tube for 3-½ hours. 5.267 grams of $B_2O_3$ were collected from the effluent steam. The original sample contained 6.45 grams of $B_2O_3$, giving an 81.7 percent yield.

What is claimed is:

1. A method for producing boric acid which comprises treating an alkali metal borate ore with concentrated sulfuric acid in an amount sufficient to provide an alkali metal to sulfur mole ratio of from approximately 1.5 to approximately 2.5, contacting the so-treated ore with superheated steam in a reaction zone maintained at a temperature at least above the volatilization temperature of the boric acid product thereby producing gaseous boron-containing material, stripping said gaseous boron containing material from said reaction zone in the gaseous effluent containing superheated steam and recovering boric acid from said gaseous material.

2. A method as recited in claim 1 wherein said alkali metal borate ore is a sodium tetraborate ore.

3. A method as recited in claim 2 wherein said sodium tetraborate ore is kernite.

4. A method as recited in claim 1 wherein said reaction zone is maintained at a temperature of between about 100° and about 600° C.

5. A method as recited in claim 1 wherein said reaction zone is maintained at a temperature of between about 100° and about 400° C.

6. A method as recited in claim 1 wherein said reaction zone is maintained at a temperature of between about 150° and about 250° C.

7. A method as recited in claim 1 wherein said borate ore has a particle size of from about 100 to about 400 mesh screen size.

8. A method as recited in claim 5 wherein at least 80 percent of said borate ore has a particle size of from about 100 to about 150 mesh screen size.

9. A method as recited in claim 1 wherein said alkali metal to sulfur mole ratio is approximately 1.9 to approximately 2.1.

10. A method for producing boric acid as recited in claim 1 wherein said alkali metal borate ore is a sodium tetraborate ore having a particle size of from about 100 to about 200 mesh screen size, said concentrated sulfuric acid has an $H_2SO_4$ content of at least 90 percent, said concentrated sulfuric acid is used in an amount sufficient to provide an alkali metal to sulfur ratio of approximately 1.9, and said temperature is maintained within said reaction zone at a temperature of between about 100° and 400° C.

* * * * *